Dec. 22, 1970     JUNNOSUKE ITOH     3,548,651

DEVICES FOR THE ADJUSTMENT OF TIRE PRESSURES

Filed Dec. 26, 1968     2 Sheets-Sheet 2

INVENTOR,
JUNNOSUKE ITOH

BY

Lowe & King

ATTORNEYS

United States Patent Office 3,548,651
Patented Dec. 22, 1970

3,548,651
DEVICES FOR THE ADJUSTMENT OF TIRE PRESSURES
Junnosuke Itoh, 345 Kynden-cho, Setagaya-ku, Tokyo, Japan
Filed Dec. 26, 1968, Ser. No. 787,158
Int. Cl. B60c 23/02
U.S. Cl. 73—146.8                  9 Claims

ABSTRACT OF THE DISCLOSURE

A pocket tire pressure gauge for checking and adjusting tire pressures comprising a manually-adjustable scale-set relief valve in direct communication with a member for connecting to a tire valve, so as to effect blowing-off of excess pressure in a tire, and optionally provided with an air inlet opening also in direct communication with the connecting member, to receive an air hose by means of which a tire can be inflated through the gauge to the required pressure, the air inlet being provided with a shut-off valve, to prevent escape of air through it when an air hose is not applied to it.

---

This invention relates to devices for the adjustment of tire presures and has for its principal object the provision of a simple device for adjusting tire pressures in a reliable manner.

Another object of the invention is to provide a simple device for checking and adjusting tire pressures.

A further object is to provide a pocket device for checking and adjusting tire pressures that is inexpensive to manufacture so as to be well within the means of the average motorist.

Yet another object is to provide a device for checking and adjusting tire pressures and suitable particularly for use in association with tire inflation equipment not of itself having a pressure gauge.

According to the present invention, a device for the adjustment of tire pressures consists of a tire pressure gauge comprising a manually-adjustable scale-set relief valve in direct communication with a member for connecting to a tire valve.

A number of embodiments of the invention will now be described, by way of example only, with reference to the accompanying drawings, in which FIG. 1 is a longitudinal sectional view of a tire pressure gauge in accordance with the invention;

Figure 3:
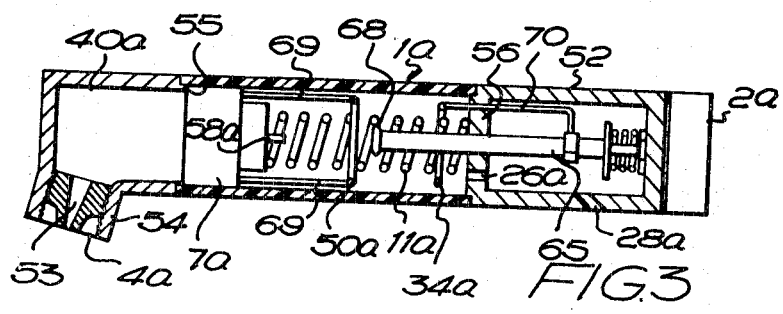
FIG. 3 is a longitudinal sectional view of the tire pressure gauge to FIG. 2.
Figure 4:
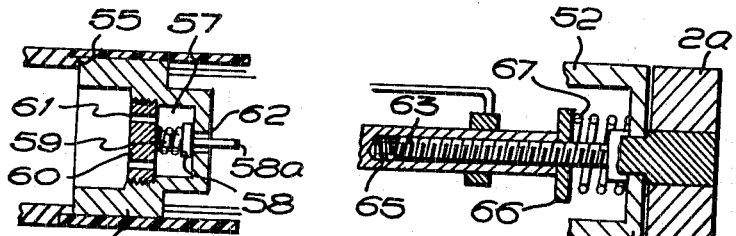
FIG. 4 is an enlarged sectional view of the piston used in the gauge of FIGS. 2 and 3.
Figure 5:
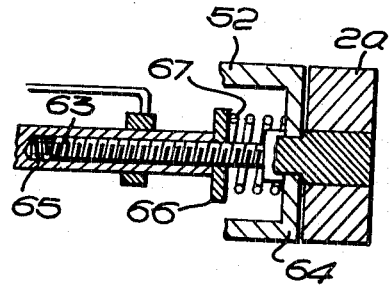
FIG. 5 is an enlarged sectional view of the adjusting cap of the gauge of FIGS. 2 and 3.
Figure 6:
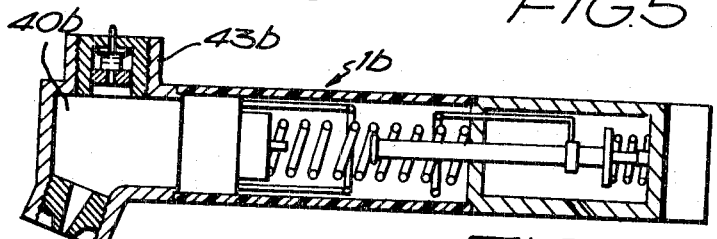

FIG. 6 corresponds to FIG. 3 but shows a modified form of gauge according to the invention; and FIGS. 7 and 8 are respectively longitudinal and part-sectional views of two further alternative forms of the invention.

Figure 1:
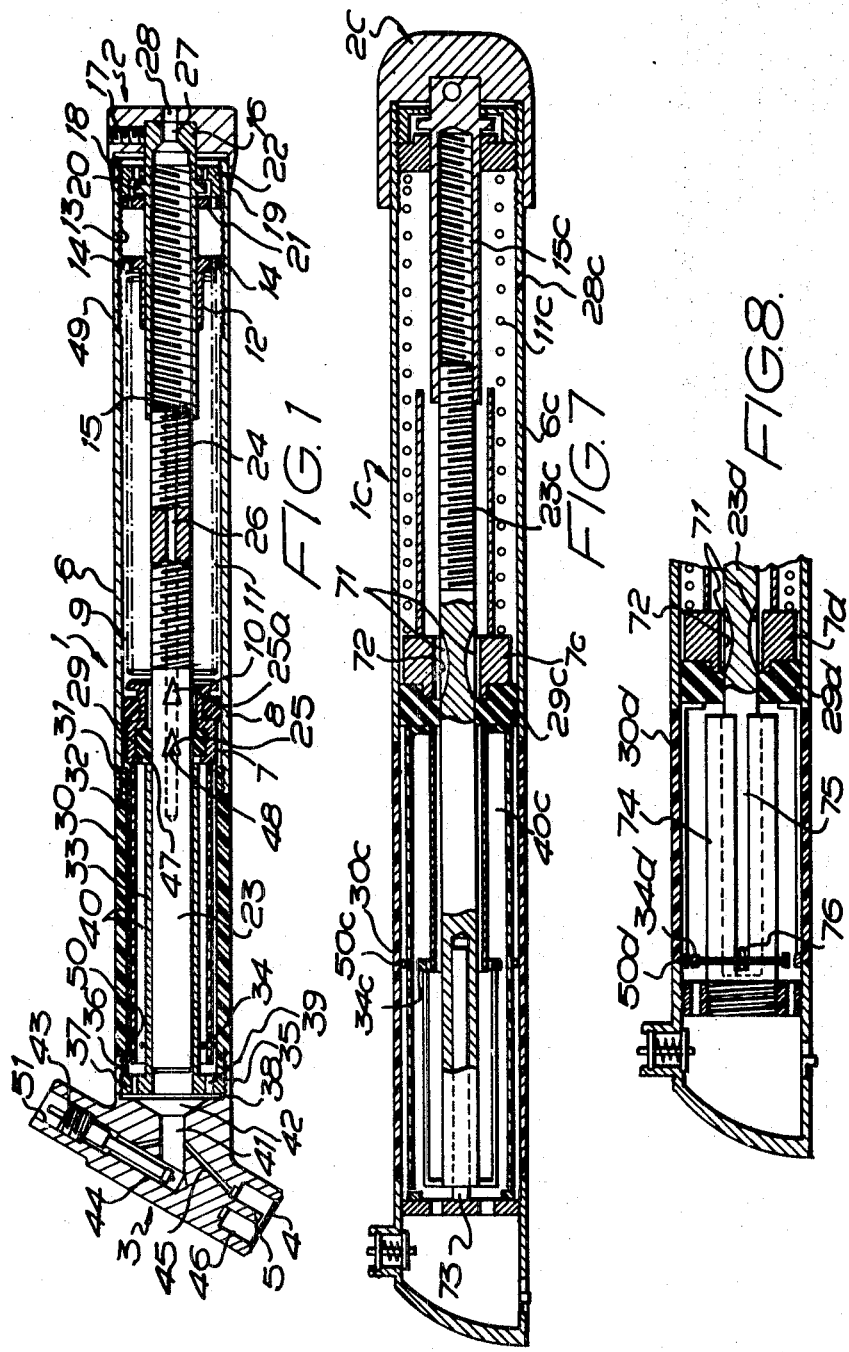
Figure 2:
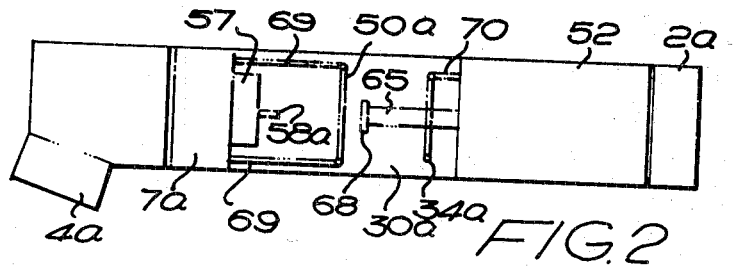
FIG. 2 is a side view of an alternative form of the present invention.

In FIG. 1, the tire pressure gauge embodies a cylindrical body 1 having at the one end an adjusting cap 2 of a slightly larger diameter and coaxially mounted on the body 1, and at the other end a head piece 3 which is provided with a connecting member 4 situated at an obtuse angle to the axis of the body. The connecting member 4 is so designed that it can be connected hermetically on to the valve of tire whereby the tire valve is opened by means of a projection 5 in the centre of connecting member 4.

A section 6 of the body 1 situated at the rear end of the device and on which the cap 2 is rotatable is in the form of a cylindrical casing and serves at the same time as a cylinder for a piston 7. The piston 7 is provided with a circular groove on its circumference in which a rubber packing ring 8 is arranged in order to provide an airtight seal between the piston 7 and the internal surface 9 of the cylindrical 6.

On the rear face of the piston 7, a circular dish-shaped spring seating 10 is provided which serves as a support for the end of a helical compression loading spring 11. The outside diameter of the spring 11 is only slightly smaller than the inside diameter of the cylinder 6 so that the spring 11 is maintained coaxial with the cylinder 6. The rear end of the spring 11 is supported and held in position by a flanged sleeve 12 which is provided with a thread on the circumference of the flange screwing into an internal thread 13 at the rear end of the body section 6. In order to facilitate screwing of the flanged sleeve 12 into position, and adjustment within the limits of the thread 13, it is provided with suitable key slots 14 on the face of the flange. By altering the position of the flanged sleeve 12 the loading spring 11 can be calibrated.

At the rear end of the body section 6, a tubular bush 15, which is provided with an internal thread, slides freely through the centre of the flanged sleeve 12. The tubular bush 15 projects out of the rear end of the body 1 and the rear section 16 of this bush is secured in the cap 2 by a setscrew 17. The cap 2 has a skirt 18 fitting over a portion of the body section 6 of reduced outer diameter and the skirt tapers to the shoulder 19 at the end of the reduced diameter portion.

Between the flanged sleeve 12 and the adjusting cap 2, an annular flange 20 is provided on bush 15, which is firmly held in position by two externally threaded washers 21 and 22 which are also screwed into the threaded rear end of the body portion 6 before the cap 2 is fitted. The rear washer 22 is provided with an extended circular ring facing towards the flat washer 21 so as to provide a cavity in which the flange 20 can rotate freely, and also to ensure that these two washers are firmly locked against each other, in order to avoid any axial movement of the bush 15 within the body. Both washers 21 and 22 are provided with key slots to enable them to be screwed into position and to be tightened against each other from the rear end of the body portion 6.

Inside the threaded bush 15 a cylindrical guide rod 23 is located at one end by means of an external thread 24 which screws into an internal thread in the bush 15, the length of the rod 23 being approximately equal to the length of the body 1 less the length of the threaded section of the bush 15. Immediately following the threaded section 24 of the rod 23 is an unthreaded smooth section in which are provided two inlet openings 25 and 25a, longitudinally adjacent to each other, which openings penetrate radially to the centre of the rod and lead into a passage 26 which is drilled axially through the centre of the rod 23 from the threaded end in the bush 15 up to a point past these two openings.

At the rear end of the bush 15 an outlet hole 27 is provided in line with a corresponding hole 28 in the adjusting cap 2 so that the inlet openings 25 and 25a are therefore in direct communication with the outlet hole 28 via the passage 26. The rod 23 also passes through the piston 7 which in addition to the rubber gasket 8 for sealing against the inner surface 9 of the shaft section 6 is also provided with a rubber gasket 29 which slides over the smooth surface of the rod 23 thereby preventing any passage of air either between the piston 7 and the cylinder 6 or between the piston 7 and the rod 23.

A front section 30 of the body 1 which has the same outer diameter as the rear section 6 and which is connected firmly with the section 6 by means of a reduced outer threaded portion 31, is provided in the form of a sight glass by using for this section transparent material. Within the sight glass section 30 a transparent coaxially situated indicating cylinder 32 is provided whch is attached to the main body of the piston 7 in any suitable manner. Within the transparent indicating cylinder 32 a scale cylinder 33 is provided situated concentrically to the sight glass section 30 and, on the surface of which cylinder a pressure indicating scale (not shown) is provided over the whole of the circumference. The inside diameter of the scale cylinder 33 is of substantially the same size as the outer diameter of the smooth part of the rod 23 so that the front end of this rod is guided and held by the scale cylinder 33. In the region of the front end of the rod 23, an indicator ring 34 which moves coaxially between the indicating cylinder 32 and the scale cylinder 33 is connected to the rod 23 e.g., through a slot (not shown) in the scale cylinder 33 so that a connecting arm (not shown) between this ring and the rod can at the same time act as a safeguard against turning or twisting of the rod 23 with respect to the body 1.

The head piece 3 is provided with a generally cylindrical extension 35 of which the outer diameter corresponds substantially to the outer diameter of the body 1 and which is provided with an internal thread into which can be screwed firmly a reduced outer threaded portion 36 of the transparent cylinder section 30.

The front end of the scale cylinder 33 is provided with an externally threaded circular flange 37 which is screwed into the head piece extension 35 before the transparent shaft section 30 is screwed into position. Between the base of the threaded section of the extension 35 and the threaded flange 37 is provided an additional unthreaded washer 38 by means of which the exact location of the scale cylinder 33 can be varied in relation to the body 1 so that by the choice of a suitable thickness of washer 38 a calibration of the tire gauge can be effected. In the threaded flange 37 of the scale cylinder 33 a number of axially drilled holes 39 are provided so that the air cavity 40 which is formed between the transparent cylindrical section 30 and the scale cylinder 33 is in direct communication with the head piece 3, which is also provided with a bore 41 coaxial to the body 1 and widened out towards the flange 37 in the form of a funnel-shaped section 42.

In the upper section of the head piece 3 a valve 43 is screwed into a position coaxial with the connecting member 4, and the interior outlet end of valve 43 is in direct communication with the passage 41 by means of a passage 44 coaxial with the connecting member 4. From the passage 41 a passage 45 of a smaller diameter is provided which enters the annular space 46 in the connecting member 4.

When the tire gauge just described is applied to a tire valve by means of the connecting member 4, the tire valve will be opened by means of the central pin 5 so that a pressure equalization will take place between the air inside the tire and that inside the gauge. The air which enters the gauge from the tire through the connecting member 4 via the passage 45 and passage 41 passes through the drilled holes 39 in the flange 37 of the scale cylinder 33, enters the air cavity 40 between the transparent sight-glass section 30 and the scale cylinder 33 and presses against the piston 7 which in turn will compress the loading spring 11 so that the piston 7 will move towards the rear end of the body 1. This movement of the piston 7 will stop immediately upon reaching a point where a balance is produced between the pressure of the spring 11 on the rear side of the piston 7 and the air pressure on the side in direct communication with the tire. Thus, the distance which the piston 7 will cover from its initial neutral position will depend upon the pressure existing in the tire.

As soon as the piston 7 reaches a position whereby the gasket 29 adjacent to the front surface 47 of the piston 7 has reached the front end 48 of the air inlet opening 25 in rod 23, the air pressing against the piston 7 will then enter the opening 25 and pass into the passage 26 in the rod 23 and from there through the threaded bush 15 and the holes 27 and 28 to blow-off into the atmosphere. This blow-off will continue until a pressure in the tire has been reached which permits the piston to take up a position such that the gasket 47 of piston 7 again covers the inlet opening 25 and thereby prevents any further escape of air. By adjusting the rod 23 lengthwise of the body 1 by means of the cap 2, a pressure can be pre-set at which the air outlet opening 25 will be closed and this pressure, the final gauged pressure of the tires can be read directly from the scale 23 by means of the indicator ring 34.

In order to avoid any excessive pressure or vacuum occurring in the space between the piston 7 and the rear end of the body 1 during the movement of the piston 7 which may falsify the readings of the loading of the spring 11, an air outlet opening 49 has been provided in the shaft section 6.

In the event of the air pressure within the tire being lower than the required pressure which has been preset by means of the adjusting cap 2 and the rod 23, the piston 7 would lie between the opening 25 in the rod 23 and the front cylinder space or cavity 40 so that no air can pass through the opening 25. In this instance the transparent indicating cylinder 32, which is attached to the piston 7, would take up a position together with the piston 7 corresponding to the pressure prevailing in the tire, so that the front section of this indicating cylinder 32 and an indicator ring 50 provided on the circumference of said cylinder 32 will indicate a pressure on the scale 33 corresponding to the prevailing tire pressure, the scale 33 being read through the transparent casing 30. The scale on cylinder 33 is therefore applicable not only for the setting indicator ring 34 but also for the pressure reading indicator 50.

In the event of a considerably higher pressure being present in the tire than that indicated by the indicator ring 34 on the rod 23 after being adjusted to the pressure required, then the piston 7 will move against the loading spring 11 with such a pressure that the momentum of said piston 7 will move the same beyond the air opening 25 to such an extent that the gasket 29 not only frees the opening 25 but also the opening 25a and thereby permits a more abundant escape of air to take place. Both openings 25 and 25a have been formed by an isosceles triangular form with the point formed by an acute angle and pointed towards the rear end of the gauge. This arrangement avoids an excessive drop in the air flow velocity from the beginning of the escape of air from the valve up to the time the correct adjustment of the pressure is achieved; i.e., the change in the rate of air egress is gradual.

An internal thread 51 is provided in the inlet to the valves 43 so that an air pressure hose from an outside air pressure source can be connected up to the head piece 3.

In the event of the tire to which the gauge is applied having a lower pressure than required as pre-set on the scale 33, then the valve 43 can be opened by means of a device or handle (not shown) unless the valve 43 is a non-return valve, and an air hose attached to force air into the tire. Specifically, the air flows through the passage 41, from whence it will flow through the passage 45 into the annular space 46 of the connecting member 4 and from there through the tire valve, so that the air pressure in the tire will be increased. The space 40 in front of piston 7 also being in communication with the air flowing into the tire, the piston 7 will be forced back in relation to the pressure increase taking place within the tire until the required pressure setting on the scale 33 has been reached. Upon reaching the pressure setting the air opening 25 in the rod 23 will be opened by passage over it of the gasket 29, so that any further air entering the valve 43 would then flow into the passage 26 and through the outlet holes 27, 28 to atmosphere.

The embodiment of the invention shown in FIGS. 2 to 5 has a cylindrical body 1a, one end of which is closed to form a chamber 40a, which is hermetically sealed to a cylindrical sight-glass section 30a consisting of transparent material and itself hermetically sealed to a control cylinder 52. Together these parts produce a complete airtight unit consisting of 3 cylinder sections of which the diameters are uniform and so chosen that it is easily held in one hand. A connecting member 4a is arranged at a slight angle to the longitudinal axis of the body 1a, the connecting member 4a being provided with an externally-threaded air nozzle 53 screwed into an opening 54 from the chamber 40a, which is separated from the section 30a by a piston 7a. The piston 7a slides inside the cylinder 30a and is urged towards a shoulder 55 by means of a loading spring 11a. The spring 11a has its rear end bearing against a separating wall 56 between the control cylinder 52 and the sight-glass cylinder 30a.

The piston 7a is formed with a housing 57 for a valve 58 urged against a valve seating by means of a coil spring 59. The coil spring 59 is supported by means of a threaded washer 60 which is screwed into the piston 7a from the opposite end to that in which the valve is situated and which washer is provided with air openings 61 parallel to the axis of the body 1a. The valve 58 is provided with a pin 58a which projects through a hole 62 against which the valve 58 is seated. This pin projects beyond the outer surface of the housing 57 and extends axially in the centre of cylinder 30a.

In order to preset the required pressure which is to be pumped into a tire, an adjusting knob 2a, which has the same diameter as the body 1a, is secured to a threaded spindle 63 which projects into the control cylinder 52 through the rear cap 64. The threaded spindle 63 screws into a threaded bore in one end of a rod 65, which carries a circular flange 66 and a coil spring 67 is located between the rear wall 64 of the control cylinder 52 and the surface of the flange 66 facing this end wall. At the front end of the rod 65 a disc 68 is provided which within the extent of its movement will press against the pin 58a of the valve 58.

A pressure scale (not shown) is provided on the sight glass cylinder 30a around substantially the full periphery thereof and is thus visible all the way round. At the rear end of the piston 7a an indicator ring 50a which is attached by means of supporting arms 69 shows against the scale markings the actual pressure existing in the tire. Another indicator ring 34a is connected to the rod 65a inside the control cylinder 52 by an arm 70 parallel to the centre line of the body 1a, which arm passes through an opening in the separating wall 56. The arm 70 also serves to prevent turning or twisting of the rod 65. The separating wall 56 also has an air outlet opening 26a and the wall of the cylinder 52 is provided with an air outlet opening 28a.

As soon as the connecting member 4a is pressed onto the tire valve this valve is immediately opened so that the interior of the tire is in direct communication with the cylinder chamber 40a in front of the piston 7a. Air will thus flow from the tire into the chamber 40a and press against the piston 7a, which will move along the sight-glass section 30a of the body 1a against the pressure of the spring 11a and until said piston 7a reaches a position in relation to the air pressure prevailing in the tire. The indicator ring 50a will show on the scale markings the pressure which is prevailing in the tire at that moment.

If the pressure inside the tire is higher than the pressure against which the circular pointer 34a is set, the operating pin 58a will be pressed back by the disc 68a situated at the end of the rod 65a, against the pressure of spirng 59, so that the valve 57 will open and air will escape from the chamber 40a through the air openings 61 and air exit opening 62 into the cylinder 30a, from there through the hole 26a into the cylinder 52, and from thence through the exit opening 28a to the atmosphere until the excessive pressure within the tire has been reduced to the pressure set on the scale. At this time, the piston 7a will have been pushed far enough back by the pressure of the spring 11a that the operating pin 58a is no longer in contact with the rod 65a, and consequently, the valve 58 is again pressed against the valve seat by the spring 59 which closes the hole 62 thereby preventing any further passage of air.

In FIG. 6 an air entry valve 43b is provided on the opposite side of the body 1b to the connecting member 4a and also in direct communication with the chamber 40b. The remaining parts of the gauge correspond exactly to those already described and shown with respect to FIGS. 2 to 5.

The operation of the air entry valve 43b is similar to that of the valve 58. As soon as the valve 43b is connected to a pressure air supply it opens and air flows immediately into the chamber 40b and from thence to a tire through the nozzle 53. At the same time the prevailing air pressure will be shown by the position of the piston 7a. As soon as the pressure as shown on the pressure indicator has reached the preset pressure, the valve 58 will be opened to permit the surplus air to escape in the manner described above so that the pressure in the tire will remain at the level then reached.

In the two further embodiments of the invention shown in FIGS. 7 and 8, a rod 23c is actuated similarly to the rod 23 shown in FIG. 1, being connected with an adjusting knob 2c by means of an internally threaded bush 15c, but in this case the rod 23c is provided on the surface with small channels 71 which run in the direction of the axis of the rod 23c to a length which exceeds the length of the gasket 29c of the piston 7c. Since the body of the piston 7c has a bore 72 of slightly larger diameter than the rod 23c, so that an annular passage is formed between said bore through the piston and the rod 23c. During use, as soon as the gasket 29c is so located that the front ends of the channels 71 are opened, air from the tire will immediately escape from the chamber 40c in front of the piston 7c to the rear section of the body 1c and from there through an air outlet 28c into the atmosphere.

Whereas in the embodiment of FIG. 7, the rod 23c is guided at its front end by an axial rod 73 which fits into a corresponding hole in the rod 23c, the rod 23d in the embodiment of FIG. 8 is held at the front end in a bush 74 which is provided on one side with a longitudinal slot 75. An arm 76, attached to the front end of the rod 23d, is guided in said slot 75 so that the rod 23d is prevented from twisting. The indicator ring 34d is attached to the arm 76 inside the casing section 30d.

In the embodiments of FIGS. 7 and 8, the location of the channels 71 is such that in the case of no pressure being present in the chamber 40c, the indicator ring 50c or 50d connected to the piston 7c or 7d is at the zero mark of the scale (not shown) on the transparent body section 30c or 30d.

In this disclosure, there is shown and described only the preferred embodiments of the invention, but, as aforementioned, it is to be understood that the invention is capable of various changes or modifications within the scope of the inventive concept as expressed herein.

What I claim is:

1. A tire pressure gauge comprising,
  (a) a generally cylindrical body,
  (b) a head at one end of the body,
  (c) a member on said head for connecting said gauge to a tire valve, (d) a scale on said body,
(e) means for setting the blow-off pressure of said gauge,
(f) a first indicator within said body attached to said setting means and movable over the scale to indicate the pressure setting,
(g) a relief valve in direct communication with the connecting member and including,
  (1) a piston,
  (2) a loading spring against which the piston is movable by the pressure transmitted from the tire to the connecting member, and
(h) a second indicator within said body and movable with the piston over the scale, and
(i) a transparent portion in said body overlying said indicators to enable the position of the same with respect to the scale to be read.

2. A tire pressure gauge as in claim 1, wherein said transparent portion of said body is of a cylindrical section, said scale extends around substantially the full periphery of said body and the indicators comprise rings positioned concentric with said body.

3. A tire pressure gauge as in claim 1, wherein is provided a guide rod, said piston being slidable in airtight manner over said rod, an axial passage in said rod, at least one opening located with relation to the length of the loading spring to be uncovered by said piston, the interior of the hollow rod communicating with an air outlet from the gauge to release the pressure at the selected point and means for adjusting the position of said one opening for adjusting the blow-off pressure.

4. A tire pressure gauge as in claim 1, wherein the piston is slidable in airtight manner over a rod, said rod being provided with at least one channel in its surface over a length in excess of the sealed length of the piston, means for adjusting the location of the channel in relation to the length of the loading spring for adjusting the blow-off pressure, and the body of the gauge being provided with an air outlet remote from the connecting member.

5. A tire pressure gauge as in claim 1, wherein the piston includes a valve member to be moved off its seat, a rod extending from the end of the gauge remote from the connecting member to actuate said valve member, and adjustable means for varying the length of said rod in relation to the length of the loading spring for adjusting the blow-off pressure, and the body of the gauge being provided with an air outlet remote from the connecting member.

6. A tire pressure gauge as in claim 1, wherein the loading spring is located at the end remote from the piston, and an abutment adjustable lengthwise within the body of the gauge for calibration of the loading spring is provided.

7. A tire pressure gauge comprising,
(a) a generally cylindrical body,
(b) a head at one end of the body,
(c) a member on said head for connecting said gauge to a tire valve,
(d) a rotatable cap at the other end of the body,
(e) a hollow rod extending axially along the body and threaded on the end,
(f) a threaded bush into which the rod screws and which is rotatable with the cap,
(g) a piston slidable in airtight manner over the rod,
(h) a loading spring against which the piston is movable by the pressure communicated from a tire through the connecting member,
(i) at least one opening in the hollow rod and an air outlet from the gauge both communicating with the interior of said rod,
(j) a transparent section in the body,
(k) a scale within the body readable through the transparent section of the body,
(l) an indicator movable over the scale with the hollow rod for setting the blow-off pressure of the gauge by location of the opening in the hollow rod in relation to the length of the loading spring, and
(m) an indicator movable over the scale with the piston to register the pressure in a tire.

8. A tire pressure gauge comprising,
(a) a generally cylindrical body,
(b) a head at one end of the body,
(c) a member on said head for connecting said gauge to a tire valve,
(d) a rotatable cap at the other end of the body,
(e) a threaded rod extending axially along the body,
(f) a threaded bush into which the rod screws and which is rotatable with the cap,
(g) a piston slidable in airtight manner over the rod,
(h) a loading spring against which the piston is movable by the pressure communicated from a tire through the tire valve and the connecting member,
(i) the body having an air outlet remote from the connecting member,
(j) at least one channel in the surface of the rod over a length in excess of the sealed length of the piston to provide communication between said valve and the air outlet,
(k) a transparent section in the body,
(l) a scale within the body readable through the transparent section of the body,
(m) an indicator movable over the scale with the rod for setting the blow-off pressure of the gauge by location of the channel in the rod in relation to the length of the loading spring, and
(n) an indicator movable over the scale with the piston to register the pressure in a tire.

9. A tire pressure gauge comprising,
(a) a generally cylindrical body,
(b) a head at one end of the body,
(c) a member on said head for connecting said gauge to a tire valve,
(d) a rotatable cap at the other end of the body,
(e) a threaded rod extending axially along the body,
(f) a screw extending from the rotatable cap and screwing into the rod,
(g) a piston slidable in the body,
(h) a loading spring against which the piston is movable by the pressure communicated from a tire through the tire valve and the connecting member,
(i) the body having an air outlet remote from the connecting member,
(j) a valve member housed in the piston and to be moved off its seat by the end of the rod remote from the rotatable cap to provide communication between said tire valve and the air outlet.
(k) a transparent section in the body,
(l) a scale within the body readable through the transparent section of the body,
(m) an indicator movable over the scale with the rod for setting the blow-off pressure of the gauge by location of the rod end in relation to the length of the loading spring, and
(n) an indicator movable over the scale with the piston to register the pressure in a tire.

References Cited
UNITED STATES PATENTS

| | | | |
|---|---|---|---|
| 1,746,923 | 2/1930 | Beeler | 137—227X |
| 1,753,118 | 4/1930 | Johansson et al. | 137—227X |

DONALD O. WOODIEL, Primary Examiner

U.S. Cl. X.R.

73—419